{"[19]"} United States Patent  [15] 3,653,924
Penton  [45] Apr. 4, 1972

[54] METHOD OF PREPARING GLAZED FOOD PRODUCTS

[72] Inventor: Edgar W. Penton, Auburn, Wash.
[73] Assignee: Eduardo's Industries, Auburn, Wash.
[22] Filed: Feb. 19, 1970
[21] Appl. No.: 12,638

[52] U.S. Cl. ..................................99/168, 99/22, 99/118 R, 99/140 R, 99/166, 99/169, 99/193, 99/194, 99/195
[51] Int. Cl. ....................A23b 1/10, A23b 3/14, A23b 7/00
[58] Field of Search .............99/166, 168, 169, 22, 1, 140 R, 99/118 R, 193, 194, 195, 192 R; 260/236.5

[56] References Cited

UNITED STATES PATENTS

| | | | |
|---|---|---|---|
| 3,078,172 | 2/1963 | Libby | 99/192 |
| 2,910,370 | 10/1959 | Rogers et al. | 99/194 |
| 3,071,475 | 1/1963 | Stohr | 99/118 |
| 3,406,081 | 10/1968 | Bauer et al. | 99/194 |
| 1,978,171 | 10/1934 | Rolle | 99/22 |

*Primary Examiner*—Morris O. Wolk
*Assistant Examiner*—Stephen B. Davis
*Attorney*—Eugene D. Farley

[57] ABSTRACT

Glazed food products are prepared by mixing together and mutually extracting predetermined quantities of a liquid fat, water and solid pieces of seasoning materials. The resulting mixture is permitted to separate into a clear liquid fat phase containing the fat soluble fraction of the seasoning material and a water phase containing dispersed pieces of the fat-insoluble fraction of the seasoning materials. The two phases are separated, after which the water phase and selected batter-forming solids are mixed in proportions predetermined to form a liquid batter. Pieces of poultry, fish, meat, vegetables or other foods are coated with the batter, breaded if desired, and thereafter glazed with the seasoned liquid fat phase. The food pieces may be frozen either before or after being glazed.

15 Claims, 1 Drawing Figure

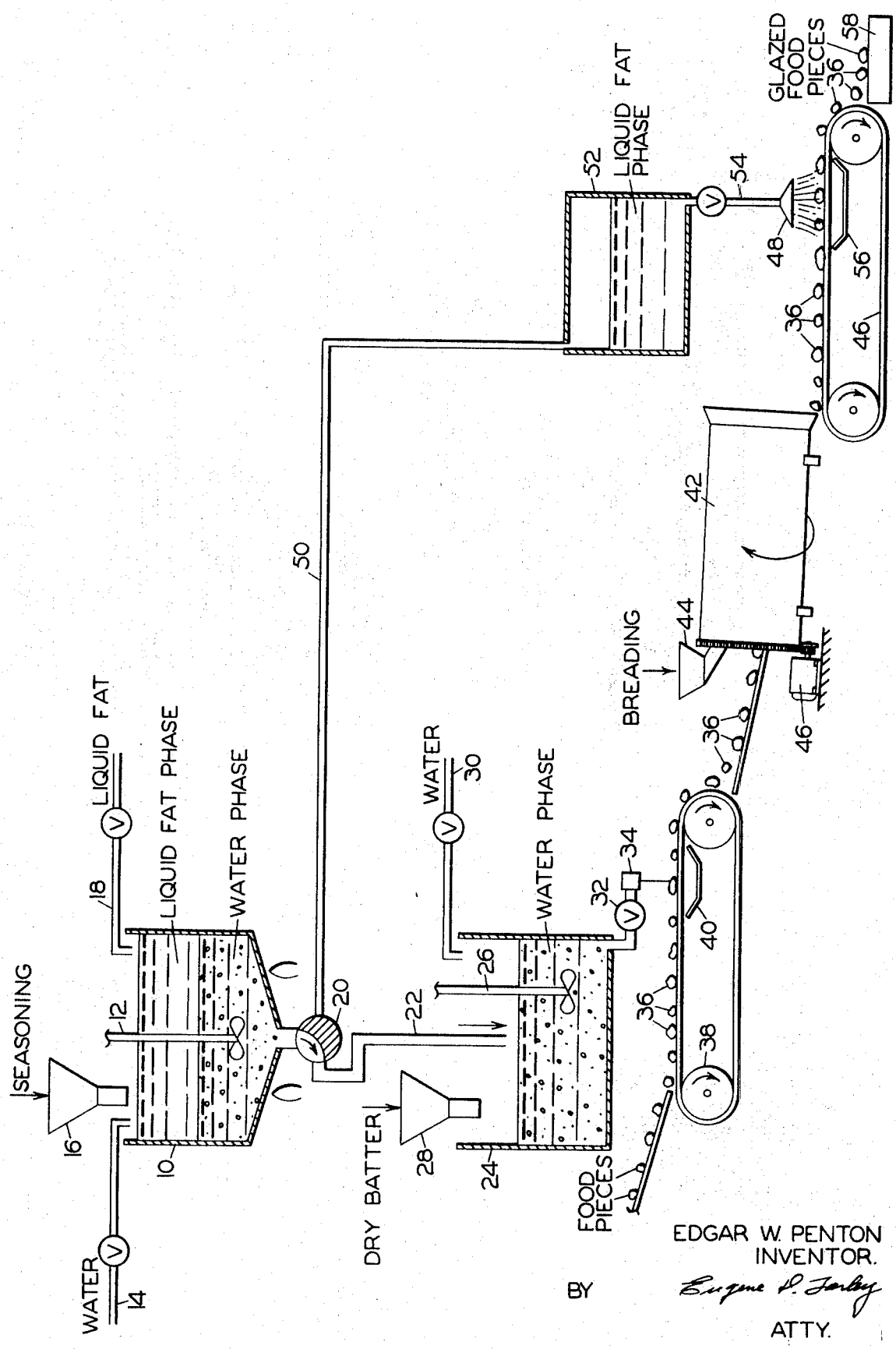

METHOD OF PREPARING GLAZED FOOD PRODUCTS

This invention relates to a method of preparing food products. It relates particularly to a method of preparing pieces of poultry, fish, meat, vegetables and other food products by coating them with successively a batter, breading, and a liquid fat glazing material preliminary to storing them and subsequently cooking them for consumption as foods.

In one method of preparing food products for distribution in commerce, cooked or uncooked pieces of poultry, fish, meat, potatoes and other vegetables are coated with a batter to seal off their surfaces, breaded to provide a medium for absorption of the flavor-imparting principles contained in the pieces and then glazed with a liquid fat. This preserves them against deterioration, seals in the flavor, and prepares them for cooking. The resulting products may be refrigerated or frozen, stored and distributed through the usual channels of commerce. When they are prepared for consumption, it merely is necessary to heat them in an oven at a suitable temperature and for a suitable time depending on the product and whether or not it has been precooked.

The resulting cooked products retain the desirable taste and texture of freshly prepared products. In addition, the oven treatment converts the glaze to delicious sauces or gravies while contemporaneously coloring the products without the necessity of pan browning them or frying them in deep fat.

In the foregoing sequence, it is preferably to incorporate the seasoning materials in the glaze. Thus the molten glazing fat is mixed with such seasoning materials as salt, pepper, paprika, mustard, various herbs and spices, pieces of dried vegetables such as onions and peppers, smoked yeast, various coloring materials and various preservatives. The glaze serves as a vehicle for the seasoning elements so that a desired barbecue or other flavor, and various gravy and sauce combinations automatically are created.

However, an inherent difficulty is presented by the fact that many of the spices and flavoring materials required to produce the desired flavors, gravies and sauces are not soluble in the fats employed as glazes. This is true, for example, in the case of various ground herbs and spices, salt crystals, particles of monosodium glutamate, and pieces of dried peppers, onions, garlic and other vegetables. When these materials are present in the molten fat used as a glaze, it is not possible to get either a uniform deposit of the glaze or a uniform distribution of the seasoning materials. It thus becomes necessary to apply excessive amounts of fat in order to seal and preserve the food products effectively.

It accordingly is the general purpose of the present invention to provide a method of preparing glazed food products in which the seasoning and flavoring materials are uniformly and effectively distributed over the surfaces of the products without interruption of the glaze and without the necessity of increasing the proportion of glazing fat beyond optimum or acceptable limits.

The manner of practicing the invention is illustrated in the single FIGURE of the drawing comprising a flow plan illustrating schematically the various steps comprising the method.

In its broad aspect, the method of my invention for preparing glazed food products comprises mixing together predetermined quantities of a liquid fat, water and solid pieces of seasoning materials. After extraction, the resulting mixture is permitted to separate into a clear seasoned liquid fat phase and a water phase containing dispersed pieces of the seasoning materials which are fat-insoluble. The two phases are separated, after which the water phase and selected batter-forming solids are mixed in proportions predetermined to form a batter. Pieces of poultry, fish, meat, vegetables or other foods are coated first with the batter and thereafter with the seasoned liquid fat phase. In this manner all the seasoning principles are uniformly distributed over the surfaces of the food pieces without interruption of the glaze.

Considering the foregoing in greater detail, and with particular reference to the drawing:

The presently described method is applicable to a broad range of food products including foods of both animal and vegetable origin. It thus is applicable to the processing of poultry such as chicken, turkey and ducks; to the processing of sea foods such as halibut and cod; and to the processing of meats such as beef, pork and mutton. It also is applicable to the processing of any vegetables which are cooked by frying, including particularly potatoes and onions.

These and other foods are prepared in the form of pieces having a size suitable for packaging, freezing and ultimate consumption. In order to retain optimum flavor the food pieces preferably are processed in their raw condition. However, application of the method to partially or completely cooked food pieces is not precluded if this is desired for a particular purpose.

The food pieces may be processed in either frozen or unfrozen condition. In the case of fish, an indicated commercial procedure would be to subdivide the frozen raw fish product as it is received from refrigerated fishing vessels, transmit the resulting frozen pieces through the complete processing cycle without thawing them, and the package the resulting frozen, processed pieces.

In the case of poultry, the process may be modified to batter and bread the raw, unfrozen poultry pieces, cook the resulting partially treated product, and then glaze the cooked intermediate. This ensures that the savory juices and seasonings will be retained in the product, and not lost to the cooking medium.

As noted above, the method herein described includes the basic steps of battering, breading and glazing the food pieces. A preliminary step comprises the preparation of an aqueous mixture containing fat-insoluble pieces of seasoning useful in the battering step, and a clear, seasoned, liquid fat useful in the glazing step. The manner of preparation and application of these two starting materials is illustrated schematically in the drawing.

For their preparation, there is provided a mixing vessel 10 having means for heating its contents to a desired temperature as well as stirring means 12 for agitating the contents. The vessel is charged by valved conduit 14 through which water may be added; a hopper 16 or other means for adding solid seasoning materials in measured amounts; and a valved conduit 18 for the introduction of liquid fat.

Any desired solid seasonings may be introduced through hopper 16. These include salt, pepper, sugar, mustard, garlic, monosodium glutamate, various solid herbs, spices, and pieces of dried green peppers, and onions and other vegetables. In addition, solid preservatives such as sodium benzoate and various coloring materials may be added.

The liquid fat introduced into mixing vessel 10 may comprise any of the edible vegetable or animal fats which are liquid at room temperatures or, if solids, meltable at about body temperature (80°–120° F.), and which conventionally are employed in the preparation of foods by frying, deep frying, or baking procedures. The fats employed thus may comprise an animal or vegetable butter, margarine, hydrogenated and unhydrogenated vegetable oil, safflower oil, hydrogenated shortening, corn oil, peanut oil, cotton seed oil, soya bean oil, beef fat and the like.

A commercial fat mixture of particular value in the practice of the present method comprises from 35–65 percent of a margarine-type vegetable oil melting at about 75° F., from 35–65 percent of vegetable or animal shortening melting at about 110° F., and from 1–10° of the glycerol higher fatty acids, percent being expressed as percent by weight.

Another comprises Durkee's "Kaomel," a fraction of hydrogenated vegetable oils having a Wilye melting point of 98–100.5°F. and a solid fat index varying from 72 ± 3 at 50° F. to 5 at 100° F.

In a preferred procedure, fat is introduced into vessel 10 and heated to a desired temperature, usually from 180° to 200° F. at which temperature any bacteria and yeast present are killed or inactivated so that the batter prepared from the product is not subject to spoilage, and may be stored for several days. The dry ingredients then are added and the mixture actively agitated for a period sufficient to effectuate the extraction from the seasoning materials of all oil soluble principles, such as the oleoresins. This may take 15 minutes or more depending on the ingredients, temperature, etc.

When the extraction is deemed complete, the active agitation is stopped and a sufficient amount of water is added to dissolve all the water-soluble elements in the mixture. At this point only mild stirring for a short time is required, as it is desirable to permit settling out of the fat and water-insoluble elements, and to avoid emulsification of the fat and water, which might occur with violent agitation.

At the conclusion of the extraction period, the stirrer is stopped. Thereupon the mixture separates into two phases: a lower water phase and a superimposed liquid fat phase. The water phase comprises a solution of the water-soluble components of the seasoning materials as well as a dispersion of substantially all of the solid pieces of herbs, dried vegetables, etc. which are soluble in neither phase.

The liquid fat phase comprises a clear liquid in which are dissolved the liquid fat soluble components of the seasoning. This phase is substantially devoid of suspended or dispersed solid particles, an attribute which makes it particularly suited for application to the glazing of the food pieces.

Next the water and liquid fat phases are withdrawn separately from the mixing vessel and distributed to their respective applications, the water phase being applied to the preparation of the batter and the liquid fat phase to the glazing operation.

To this end the water phase is withdrawn first from vessel 10 through a three-way valve 20. If desired, the water phase may be spray dried and the spray dried seasoning product stored and thereafter reconstituted by mixing with water. In either case it is introduced into a second mixing vessel 24, where it is cooled to room temperature to ensure batter uniformity.

Like vessel 10, vessel 24 is provided with an agitating means 26. It further is provided with a hopper 28 for introduction of solid materials and with a valved conduit 30 for the introduction of water. A valved withdrawal conduit 32 is located in vessel-draining position at the bottom of the vessel. It communicates with a conventional battering machine 34 into which the vessel contents are discharged.

Water, the water phase from mixer 10 (or the spray dried product thereof), and dry batter-forming ingredients are introduced into mixing vessel 24 in proportions calculated to produce a batter of the desired consistency and flavor. The batter serves its usual purpose of coating the pieces of food for simultaneously preventing the natural juices from flowing out of the food while at the same time adding seasoning materials to enhance its flavor.

The dry, batter-forming constituents may comprise wheat flour, rye flour, cornmeal, egg solids, milk solids, soya flour, dried whey, algin gum, dextrose, carboxyl methyl cellulose, and various seasoning materials such as salt, pepper and spices. With respect to seasoning materials, it is to be noted that the solid pieces of seasoning materials and the dissolved seasonings present in the water phase withdrawn from mixer 10, also are present and contribute to the overall flavor of the product without interfering with the application of the various coatings applied to the food pieces.

After having been mixed to the desired consistency, the batter is flowed through curtain coater 34 or equivalent coating appliance onto food pieces 36 continuously conveyed beneath the curtain coater on an endless screen conveyor 38.

A vat 40 is located beneath the conveyor in alignment with the curtain coater. It collects the excess batter, which is recycled or otherwise disposed of.

The batter-coated food pieces next are introduced into a tumbling apparatus 42 or equivalent unit for the application of breading.

Tumbling unit 42 may be of conventional construction. It is rotatably mounted at a slight angle in the downstream direction and powered by a suitable means such as an electric motor 46. The food pieces are introduced at the upstream end and discharged at the downstream end. Breading materials are introduced through a hopper 44 at the upstream end.

The breading material provides an absorptive medium in which natural juices exuding from the food pieces are absorbed. This conserves and retains the natural fresh flavor and nutritive value of the products. The breading also serves as a medium for absorbing and fixing the liquid fat to be applied as a glaze in the succeeding step of the herein described sequence.

Any of the conventional breading materials may be applied to the indicated purpose, in cooked or uncooked condition. Such materials include principally bread crumbs and cereal crumbs of suitable size. If desired, the crumbs may be browned preliminary to application. Also, flour-containing mixtures which form bread upon cooking may be used. Salt, pepper, spices and other seasoning materials may be included as desired.

The breaded food pieces are discharged from the downstream end of the breading unit 42 onto an endless conveyor 46. This conveys the pieces beneath a spray head 48 or other suitable unit for coating the pieces with liquid fat, or to an intermediate cooking and freezing operation.

As noted above, the liquid fat employed is that prepared in mixing vessel 10. It comprises a clear liquid containing the fat-soluble components of the seasoning.

This clear liquid is transferred through conduit 50 into a storage vessel 52 which is insulated or heated as required to maintain the liquid fat in a molten condition. It also has a valved discharge conduit 54 communicating with spray head 48.

The liquid glazing material is sprayed on the food pieces moving past spray head 48 on conveyor 46 in an amount sufficient to coat the pieces uniformly with a glaze coating. A high degree of efficiency is possible in the coating operation in view of the fact that the fat-insoluble components of the solid seasoning materials have been removed from the liquid previously. However, these components have not been lost, but contribute to the total flavor of the product by having been incorporated in the batter mix prepared in mixing vessel 24.

Overspray from spray head 48 is collected in a receptacle 56 mounted beneath spray head 48 and the upper stretch of conveyor 46. It may be recycled to storage vessel 52.

The glazed food pieces are discharged from the downstream end of conveyor 46 into a suitable storage receptacle, or off-bearing conveyor, indicated at 58. They may be consumed immediately, or, as is more usual, refrigerated or frozen and stored preliminary to distribution and merchandising.

A typical formulation and procedure illustrating the presently described method as applied to the glazing of raw poultry or fish pieces is as follows:

1,000 pounds of product needs
60 pounds of batter dry mix
120 pounds of breading
120 pounds of water 1,300 pounds of breaded product needs:
100 pounds of liquid fat
40 pounds of seasoning 1,440 pounds result In the above formulation, the battery dry mix comprises by weight 65 percent hard wheat flour, 15 percent soya flour, 15 percent corn flour and 5 percent carboxyl methyl cellulose.

The liquid fat is a low melting butter comprising from 35–50 percent margarine-type vegetable oil melting at about 75° F.; from 35–50 percent vegetable shortening melting at about 110° percent F.; and from 1–10 percent of the glycerol esters of the higher fatty acids, percentage being expressed in percent by weight.

The seasoning comprises a dry mixture of salt, pepper, paprika, monosodium glutamate, smoke flavored dry yeast, dehydrated onion, garlic, and other spices.

The seasoning is blended into the melted hard butter by agitating it at 185° F. for one-half hour. This extracts the fat-soluble components from the seasoning, deactivates the yeast and destroys bacteria. One-hundred pounds of water is added and the stirring continued gently at 185° F. for an additional 5 minutes. This dissolves the water-soluble components of the seasoning. The stirring then is stopped, whereupon the mixture separates into two phases, a water phase and a liquid phase.

The water phase is withdrawn from the liquid fat phase and mixed with the dry batter mix. An additional 20 pounds of water is added to prepare a batter having a proper consistency for application to the product.

The uncooked food pieces are battered with the foregoing mixture and then breaded. They may then be cooked in an oven or by other means if a pre-cooked item is desired. They are cooled or, in most cases, frozen, and then glazed with the separated liquid fat phase. They may be cooked and consumed immediately, or refrigerated pending future consumption. In normal commercial operation, it is contemplated that the glazed pieces are frozen under the customary conditions and transported and distributed through the usual commercial channels.

To prepare the food for consumption, it merely is necessary to place the pieces in an oven in the frozen or thawed condition. They are baked at a temperature determined by their identity and intended use. However, baking at a temperature of from 375°–400° F. for from 25-75 minutes is generally indicated.

The oven treatment not only cooks the food or heats it, if previously precooked, but also produces a sauce or gravy having a flavor determined by the seasoning. Because of the uniform application of the glaze, the pieces are given a distinctive color depending on the nature of the glaze: Deep reddish brown where the glaze is a barbecue glaze, golden yellow where the glaze is a lemon glaze, pale green where the glaze is a tartar sauce glaze, etc. In addition, the products are characterized by superior flavor because of the sealing in of the natural juices, the uniform application of glaze, and the development of flavor by baking.

Having thus described my invention in preferred embodiments, I claim:

1. The method of preparing glazed food products which comprises:
   a. extracting solid pieces of seasoning materials at least some of which are substantially fat-insoluble with a mixture of predetermined quantities of a liquid fat and water,
   b. permitting the resulting mixture to separate into a seasoned liquid fat phase and a water phase containing dispersed pieces of the fat-insoluble seasoning materials,
   c. separating the liquid fat and the water phases,
   d. mixing the water phase and batter-forming solids in proportions predetermined to form a batter,
   e. coating the food pieces with the batter, and
   f. coating the batter-coated food pieces with the seasoned liquid fat phase.

2. The method of claim 1 wherein the liquid fat comprises a melted butter.

3. The method of claim 1 wherein the liquid fat comprises a molten mixture containing from 35-65 percent margarine-type vegetable oil melting at about 75° F., from 35-65 percent vegetable shortening melting at about 110° F. and from 1 to 10 percent of the glycerol esters of the higher fatty acids, percentage being expressed in percent by weight.

4. The method of claim 1 wherein the liquid fat comprises a vegetable fat having a Wilye melting point of from 98–100.5° F. and a solid fat index from $72 \pm 3$ at 50° F. to 5 at 100° F.

5. The method of claim 1 including the step of breading the batter-coated food pieces preliminary to coating them with the seasoned liquid fat phase.

6. The method of claim 1 including the steps of spray-drying the water phase, mixing the spray dried product with the batter-forming solids, and forming the batter from the resulting mixture of solids and a predetermined proportion of water.

7. The method of claim 1 wherein the seasoning material pieces are extracted first with a liquid fat at a temperature of from 180° to 200° F. to sterilize the pieces, and then with water in the presence of the fat.

8. The method of claim 1 including the step of freezing the food pieces after they have been coated with liquid fat phase.

9. The method of claim 1 wherein the food pieces are battered and gazed in the frozen condition.

10. The method of claim 1 wherein the food pieces are battered raw, cooked, and glazed in the cooked condition.

11. The method of claim 1 wherein the food comprises poultry pieces.

12. The method of claim 1 wherein the food comprises fish pieces.

13. The method of claim 1 wherein the food comprises meat pieces.

14. The method of claim 1 wherein the food comprises pieces of vegetables.

15. The method of claim 1 wherein the food comprises potato pieces.

* * * * *